W. J. KRAUSE.
STOCK WATERER.
APPLICATION FILED FEB. 27, 1918.

1,262,059.

Patented Apr. 9, 1918.

WITNESS:

INVENTOR
William J. Krause
BY
ATTORNEY

UNITED STATES PATENT OFFICE.

WILLIAM J. KRAUSE, OF RANDOM LAKE, WISCONSIN.

STOCK-WATERER.

1,262,059.  Specification of Letters Patent.  Patented Apr. 9, 1918.

Application filed February 27, 1918. Serial No. 219,448.

*To all whom it may concern:*

Be it known that I, WILLIAM J. KRAUSE, a citizen of the United States, and resident of Random Lake, in the county of Sheboygan and State of Wisconsin, have invented certain new and useful Improvements in Stock-Waterers; and I do hereby declare that the following is a full, clear, and exact description thereof.

My invention relates to new and useful improvements in stock waterers, and has for its principal object the provision of simply constructed and efficient means for readily removing the usual bowl from and attaching the same to a water supply pipe. This permits the bowl to be easily and efficiently cleaned at will.

A further object is to provide a simply constructed and efficient device of this character which can be inexpensively manufactured and marketed and one which will be very efficient in operation.

With these and other objects in view the invention resides in the novel features of construction, combination and arrangement of parts which will be hereinafter more particularly described and claimed and shown in the drawing, wherein:—

Figure 1:
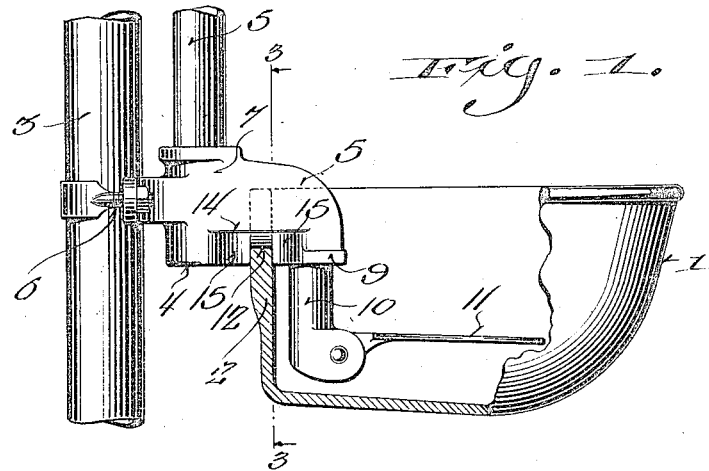
Figure 1 represents a side elevation, partly in section, of a stock waterer constructed in accordance with my invention, said section being taken substantially on the line 1—1 of Fig. 2.

Referring more particularly to the drawing it will be seen that the numeral 1 denotes a bowl of conventional design, the inner wall 2 of which is preferably straight and is provided with means for detachable engagement with a suitable support. The support may be of any desired nature, but in the present embodiment of my invention it consists of a vertical stand-pipe 3 through which the water may flow to a valved coupling 4 through a feed pipe 5. The coupling is clamped to the pipe 3 as shown at 6.

Figure 2:
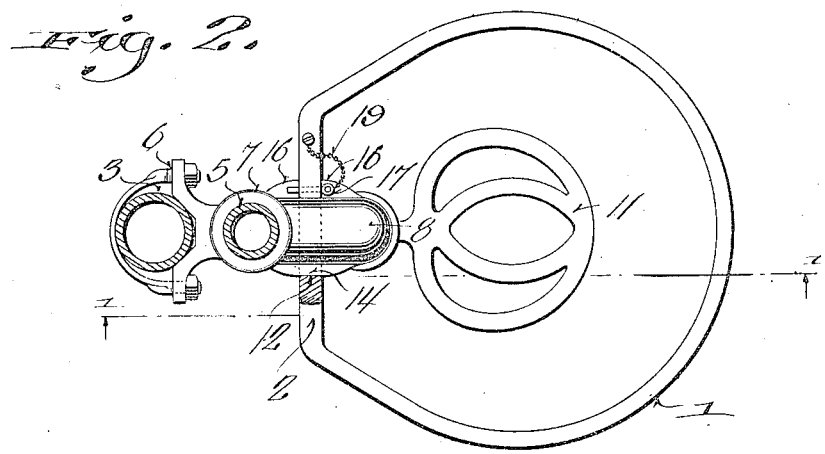
Fig. 2 is a horizontal section through the supporting means of the waterer, showing the bowl thereof in plan view.

This coupling is of an improved design, it having a vertical sleeve 7 and a horizontal arm portion 8 which merges into a downwardly extending outlet 9. The feed pipe is threaded into the upper end of the sleeve 7, the other end being closed, and an outlet pipe 10 is similarly connected with the outlet 9; the sleeve 7 also carries one portion of the clamp 6 as clearly shown in Fig. 1 and 2.

Most devices of this character have means for automatically supplying water to the bowl, such means usually being actuated by the animal while drinking. In the present instance the outlet pipe 10 carries a valve which is operated by a lever plate 11. When the water in the bowl is low the animal endeavoring to obtain the same will strike its nose against the plate 11 and open the valve in said pipe 10, thereby increasing the supply of water.

The bowl 1 is detachably connected with the horizontal portion 8 of the coupling by coöperating means on both of these parts. That is to say the wall 2 of the bowl has its upper edge notched as at 12 and provided with a finger 13 which extends into said notch from one side thereof. The finger interlocks with a laterally extending horizontally disposed flange 14 formed integrally with one side of the portion 8 of said coupling. The coupling 8 is also provided with a pair of depending transversely extending flanges 15 which are disposed substantially at right angles to the flange 14, said flanges 15 being projected beyond the side of the coupling to provide a pair of spaced shoulders 16.

Figure 3:
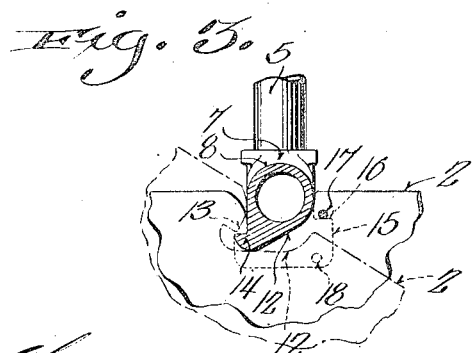
Fig. 3 is a detail transverse sectional view on the plane of the line 3—3 of Fig. 1.

It will be noted from Fig. 3 that the finger 13 is engaged with the flange 14 by partial rotation of the bowl about the horizontal portion 8 of the coupling, or until the bottom of the notch 12 engages the under side of said coupling. When this engagement is attained a pin 17 is inserted through an opening 18 in the wall 2 of the bowl so as to engage on the shoulders 16. It will thus be seen that one side of the notch 12 is held in engagement with the coupling by the coaction between the finger 13 and the flange 14, while at the other side are disposed the shoulders 16 and pin 17. Inasmuch as the flanges 15 are spaced apart a distance substantially equal the thickness of the wall 2, it will be seen that longitudinal as well as rotary movement of the bowl is prevented when the parts are interlocked as shown in the figures.

In detaching the bowl it is simply necessary to remove the pin 17 which is secured to the bowl by a chain 19 and permit the same to revolve slightly as indicated by the dot and dash lines in Fig. 3.

I claim:—

1. A device of the class described comprising a support, a bowl adapted to be carried by said support, coöperating means on the bowl and support for connecting the former with one side of the latter when one is rotated with respect to the other, and detachable means for connecting the other side of said support and the bowl.

2. A device of the class described comprising a support, a bowl having a notch in one wall to receive the support, means for detachably connecting the bowl to the support including a flange, a finger projecting from one side of the notch for engagement with the flange, and detachable means on the bowl for engagement with the support.

3. A device of the class described comprising a support, a bowl having a notch in one wall to receive the support, means for detachably connecting the bowl to the support including a flange extending from one side of the support, a shoulder on the other side of the support, a finger projecting from one side of the notch for engagement with the flange, and a pin extending from the wall of the bowl to engage over the shoulder.

4. A device of the class described comprising a support, a bowl having a notch in one wall to receive the support, means for detachably connecting the bowl to the support including a flange extending from one side of the support, a pair of spaced shoulders to receive the wall of the bowl therebetween, said shoulders being disposed on the other side of the support, a finger projecting from one side of the notch for engagement with the flange, and means carried by the bowl for detachable engagement with said shoulders.

5. A device of the class described comprising a substantially vertical support, a member extending substantially horizontally from the vertical support, a horizontal flange projecting laterally from one side of the member, a pair of depending flanges extending from the under side of the member and at right angles to the horizontal flange, said pair of flanges projecting beyond the side of the member opposite to the horizontal flange to provide a pair of shoulders, a bowl having a notch in one wall to receive said member, a finger extending from one side of the notch for engagement with the horizontal flange, said pair of flanges being adapted to receive the wall of the bowl therebetween, and a pin extending from the bowl and disposed over said pair of shoulders.

In testimony that I claim the foregoing I have hereunto set my hand at Random Lake, in the county of Sheboygan, and State of Wisconsin.

WM. J. KRAUSE.